US012694207B2

(12) United States Patent
Li et al.

(10) Patent No.: US 12,694,207 B2
(45) Date of Patent: Jul. 28, 2026

(54) IMAGE EDITING

(71) Applicant: BEIJING BAIDU NETCOM SCIENCE TECHNOLOGY CO., LTD., Beijing (CN)

(72) Inventors: Guohao Li, Beijing (CN); Jiachen Liu, Beijing (CN); Xinyan Xiao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 111 days.

(21) Appl. No.: 18/953,942

(22) Filed: Nov. 20, 2024

(65) Prior Publication Data

US 2025/0078369 A1    Mar. 6, 2025

(30) Foreign Application Priority Data

Jan. 5, 2024    (CN) .......................... 202410024309.8

(51) Int. Cl.
| | |
|---|---|
| *G06T 11/60* | (2026.01) |
| *G06F 40/174* | (2020.01) |
| *G06F 40/186* | (2020.01) |
| *G06F 40/40* | (2020.01) |

(Continued)

(52) U.S. Cl.
CPC ............ *G06T 11/60* (2013.01); *G06F 40/174* (2020.01); *G06F 40/186* (2020.01); *G06F 40/40* (2020.01); *G06T 5/60* (2024.01); *G06T 5/70* (2024.01); *G06T 2207/20081* (2013.01); *G06T 2207/20084* (2013.01); *G06T 2207/20092* (2013.01)

(58) Field of Classification Search
CPC ... G06T 11/60; G06T 5/60; G06T 5/70; G06T 2207/20081; G06T 2207/20084; G06T 2207/20092; G06F 40/40; G06F 40/174; G06F 40/186
USPC ......................................................... 345/619
See application file for complete search history.

(56) References Cited

U.S. PATENT DOCUMENTS

| | | |
|---|---|---|
| 2020/0066261 A1 | 2/2020 | Ganz et al. |
| 2023/0118966 A1 | 4/2023 | Liu |
| 2024/0161240 A1* | 5/2024 | Zhang ....................... G06T 5/50 |

(Continued)

FOREIGN PATENT DOCUMENTS

| | | |
|---|---|---|
| CN | 116363261 A | 6/2023 |
| CN | 116843795 A | 10/2023 |

(Continued)

OTHER PUBLICATIONS

Office Action from CN application No. 202410024309.8, mailing date: Dec. 25, 2024, 12 pages.

(Continued)

*Primary Examiner* — Jin Ge
(74) *Attorney, Agent, or Firm* — FisherBroyles, LLP

(57) ABSTRACT

A method is provided that includes: obtaining an editing instruction input by a user in a current round of a dialogue and history dialogue information in at least one history round of the dialogue, wherein the history dialogue information comprises a history dialogue text and at least one history image; determining a source image to be edited from the at least one history image based on the editing instruction and the history dialogue information; and editing the source image to generate a target image based on the editing instruction.

15 Claims, 6 Drawing Sheets

(51) Int. Cl.
    *G06T 5/60*         (2024.01)
    *G06T 5/70*         (2024.01)

(56)              References Cited

U.S. PATENT DOCUMENTS

| | | | | |
|---|---|---|---|---|
| 2024/0296606 A1* | 9/2024 | Smetanin | ................ | G06T 11/60 |
| 2024/0338862 A1* | 10/2024 | Liu | ........................ | G06T 11/00 |
| 2024/0338869 A1* | 10/2024 | Zhou | ....................... | G06T 11/60 |

FOREIGN PATENT DOCUMENTS

| | | | |
|---|---|---|---|
| CN | 116958324 | A | 10/2023 |
| CN | 116958325 | A | 10/2023 |
| CN | 117173284 | A | 12/2023 |
| CN | 117252947 | A | 12/2023 |

OTHER PUBLICATIONS

EESR of the counterpart EP application No. 24223457.3 (Official mailing date: Apr. 17, 2025), 10 pages.

Jing Yu Koh et al: "Generating Images with Multimodal Language Models", arxiv.org, Cornell University Library, 201 Olin Library Cornell University Ithaca, NY 14853, May 26, 2023.

Jingxuan Wei et al: "DialogPaint: A Dialog-based Image Editing Model", arxiv.org, Cornell University Library, 201 Olin Library Cornell University Ithaca, NY 14853, Mar. 17, 2023.

Qian Wang et al: "InstructEdit: Improving Automatic Masks for Diffusion-based Image Editing With User Instructions", arxiv.org, Cornell University Library, 201 Olin Library Cornell University Ithaca, NY 14853, May 29, 2023.

Wei Li et al: "UNIMO-G: Unified Image Generation through Multimodal Conditional Diffusion", arxiv.org, Cornell University Library, 201 Olin Library Cornell University Ithaca, NY 14853, Jun. 6, 2024.

Jingxuan Wei, et al., "DialogPaint: A Dialog-based Image Editing Model," arXiv 2303. 10073v2, published Oct. 18, 2023.

* cited by examiner

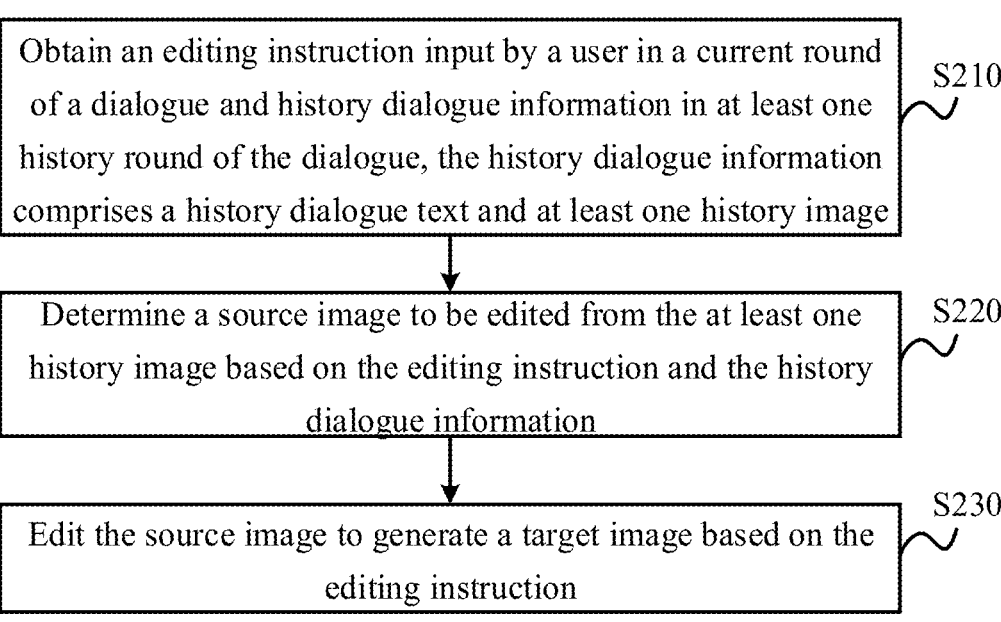

200

Obtain an editing instruction input by a user in a current round of a dialogue and history dialogue information in at least one history round of the dialogue, the history dialogue information comprises a history dialogue text and at least one history image    S210

Determine a source image to be edited from the at least one history image based on the editing instruction and the history dialogue information    S220

Edit the source image to generate a target image based on the editing instruction    S230

IMAGE EDITING

CROSS-REFERENCE TO RELATED APPLICATIONS

This application claims priority to Chinese patent application No. 2024100243098, filed on Jan. 5, 2024, the contents of which are hereby incorporated by reference in their entirety for all purposes.

TECHNICAL FIELD

The present disclosure relates to the technical field of artificial intelligence, particularly to the technical fields of natural language processing, computer vision, deep learning, and specifically to an image editing method, an electronic device, and a computer-readable storage medium.

BACKGROUND ART

Artificial intelligence (AI) is the discipline of studying the making of computers to simulate certain thinking processes and intelligent behaviors of a human being (such as learning, reasoning, thinking, planning, etc.), and there are both hardware-level and software-level technologies. The artificial intelligence hardware technologies generally include technologies such as sensors, special artificial intelligence chips, cloud computing, distributed storage, big data processing, etc.; The artificial intelligence software technologies mainly include computer vision technology, speech recognition technology, natural language processing technology, machine learning/deep learning, big data processing technology, knowledge diagram technology and other major technological directions.

A Large Language Model (LLM, also known as Large Model) is a deep learning model trained using large amounts of text data, which can generate natural language text or understand the meaning of natural language text. The Large Language Model can process a variety of natural language tasks, such as dialogue, text categorization, text generation, etc., and is an important pathway to artificial intelligence. Some Large Language Models also have multi-modal data processing capabilities, such as the ability to process multi-modal data like text, images, and videos etc.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, an image editing method is provided, comprising: obtaining an editing instruction input by a user in a current round of a dialogue and history dialogue information in at least one history round of the dialogue, wherein the history dialogue information comprises a history dialogue text and at least one history image; determining a source image to be edited from the at least one history image based on the editing instruction and the history dialogue information; and editing the source image to generate a target image based on the editing instruction.

According to an aspect of the present disclosure, an electronic device is provided, comprising: a processor; and a memory communicatively connected to the processor; wherein the memory stores instructions executable by the processor, and the instructions, when executed by the processor, cause the processor to perform operations comprising: obtaining an editing instruction input by a user in a current round of a dialogue and history dialogue information in at least one history round of the dialogue, wherein the history dialogue information comprises a history dialogue text and at least one history image; determining a source image to be edited from the at least one history image based on the editing instruction and the history dialogue information; and editing the source image to generate a target image based on the editing instruction.

According to an aspect of the present disclosure, a non-transitory computer-readable storage medium is provided. The storage medium stores computer instructions which are configured to enable a computer to perform operations comprising: obtaining an editing instruction input by a user in a current round of a dialogue and history dialogue information in at least one history round of the dialogue, wherein the history dialogue information comprises a history dialogue text and at least one history image; determining a source image to be edited from the at least one history image based on the editing instruction and the history dialogue information; and editing the source image to generate a target image based on the editing instruction.

BRIEF DESCRIPTION OF THE DRAWINGS

The drawings illustrate embodiments and constitute a part of the specification, and are used in conjunction with the textual description of the specification to explain the example implementations of the embodiments. The illustrated embodiments are for illustrative purposes only and do not limit the scope of the claims. Throughout the drawings, like reference numerals refer to similar but not necessarily identical elements.

FIG. 2 illustrates a flowchart of an image editing method according to embodiments of the present disclosure;

DETAILED DESCRIPTION OF EMBODIMENTS

Figure 1:
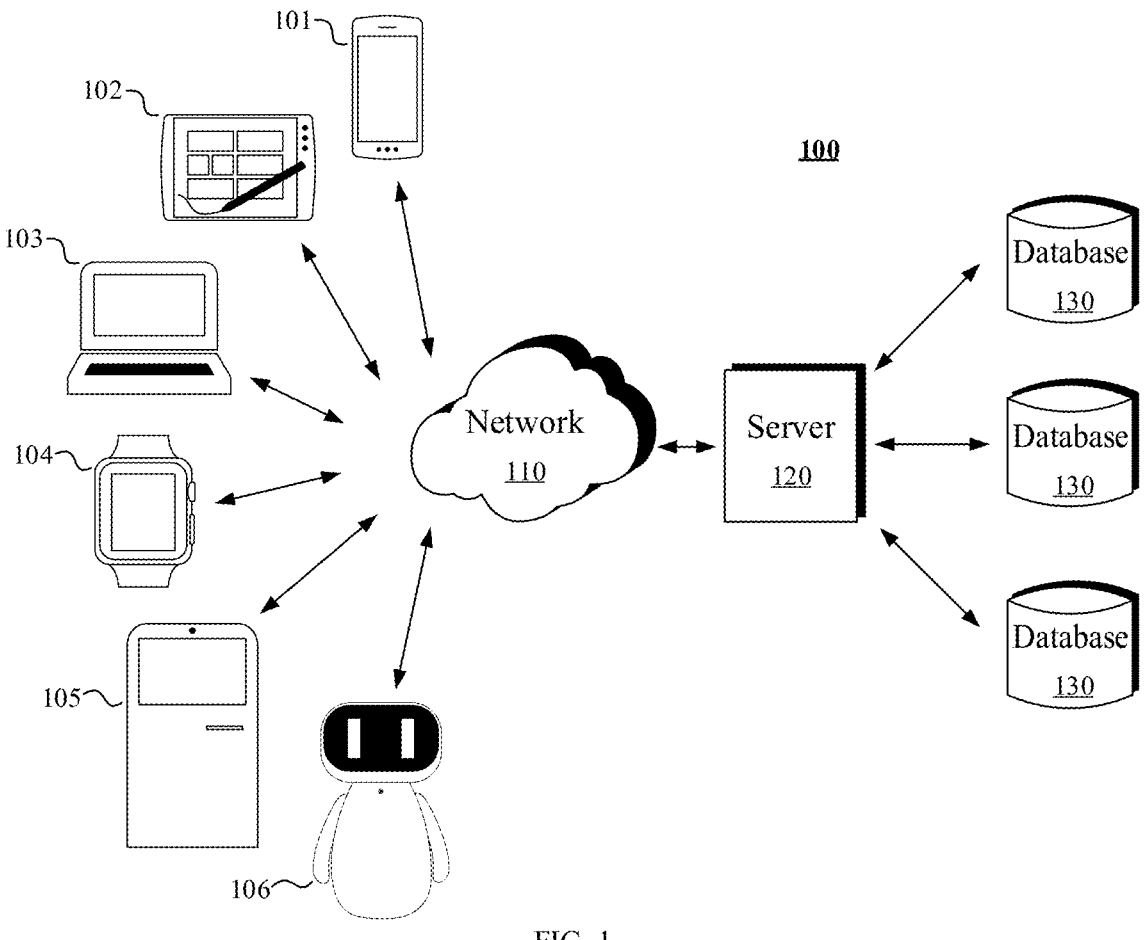
FIG. 1 illustrates a schematic diagram of an example system in which various methods described herein may be implemented according to embodiments of the present disclosure.

Example embodiments of the present disclosure are described below with reference to the accompanying drawings, which include various details of the embodiments of the present disclosure to facilitate understanding, and should be considered as merely examples. Therefore, one of ordinary skill in the art should recognize that various changes and modifications may be made to the embodiments described herein without departing from the scope of the present disclosure. Similarly, descriptions of well-known functions and structures are omitted in the following description for the purpose of clarity and conciseness.

In the present disclosure, unless otherwise specified, the terms "first", "second" and the like are used to describe various elements and are not intended to limit the positional relationship, timing relationship, or importance relationship of these elements, and such terms are only used to distinguish one element from the other. In some examples, the first element and the second element may refer to the same instance of the element, while in some cases they may also refer to different instances based on the description of the context.

The terminology used in the description of the various examples in this disclosure is for the purpose of describing particular examples only and is not intended to be limiting. Unless the context clearly indicates otherwise, if the number of elements is not specifically defined, the element may be one or more. In addition, the terms "and/or" used in the present disclosure encompass any one of the listed items and all the possible combinations thereof. The term "plurality" refers to two or more.

The acquisition, storage, and application of user's personal information involved in the technical solutions of the present disclosure are all in compliance with relevant laws and regulations and do not violate public order and good morals.

Image editing refers to modifying an existing image, for example, adjusting brightness and contrast, and adding, modifying, deleting elements in the image, etc., to obtain a new image.

In the related art, conventional image editing tools, such as Photoshop, CoreDraw and other drawing software, are often used to edit images. The use threshold of these image editing tools is high, the user needs to undergo specialized training, and the operation process is complex and tedious, resulting in low efficiency and high cost of image editing, which makes it difficult to meet the requirements of the users.

With the development of artificial intelligence technology, generative image editing techniques, such as image inpainting model and image outpainting model, have shown great potential in image editing tasks. Although the generative image editing techniques have effectively improved the efficiency of image editing compared to conventional image editing tools, they still require the user to perform tedious and specialized operation steps to obtain an ideal editing result. For example, for the generative image inpainting model, the user first needs to specify an image area to be edited by smearing, and then input a piece of empirical, elaborately-structured text (prompt), and the usage varies depending on different editing purposes (e.g., the addition, modification, deletion of elements, etc.). The user needs to understand relevant algorithmic principles, parameter settings and other specialized knowledge to obtain an ideal editing effect. Therefore, the generative image editing techniques are still difficult for the user to use, and the efficiency of image editing is low, which makes it difficult to meet the requirement of the user.

As can be seen from the above, the image editing solutions in the related art are not universal, the use threshold is high for the user, the operation process is complex and tedious, the image editing efficiency is low, which makes it difficult to meet the requirements of the user.

For the above problems, embodiments of the present disclosure provide a multi-round conversational image editing method. By combining history dialogue information, an editing object (i.e., the source image), to which a current editing instruction of a user is directed, is accurately understood, and then the source image is edited based on the editing instruction of the user to generate a target image. The embodiments of the present disclosure understand and meet the image editing requirement of the user by a unified and natural multi-round dialogue approach, which significantly reduces the operation complexity for the user and improves the image editing efficiency and the user experience.

Embodiments of the present disclosure will be described in detail below with reference to the accompanying drawings.

FIG. 1 illustrates a schematic diagram of an example system 100 in which various methods and apparatuses described herein may be implemented in accordance with embodiments of the present disclosure. Referring to FIG. 1, the system 100 includes one or more client devices 101, 102, 103, 104, 105 and 106, a server 120, and one or more communication networks 110 that couple one or more client devices to the server 120. The client devices 101, 102, 103, 104, 105, and 106 may be configured to execute one or more applications.

In embodiments of the present disclosure, the client devices 101, 102, 103, 104, 105, 106 and the server 120 may run one or more services or software applications that enable execution of the image editing method or image editing methods.

In some embodiments, the server 120 may also provide other services or software applications, which may include non-virtual environments and virtual environments. In some embodiments, these services may be provided as web-based services or cloud services, such as to the user of the client devices 101, 102, 103, 104, 105, and/or 106 under a Software as a Service (SaaS) model.

In the configuration shown in FIG. 1, the server 120 may include one or more components that implement functions performed by the server 120. These components may include software components, hardware components, or a combination thereof that are executable by one or more processors. The user operating the client devices 101, 102, 103, 104, 105, and/or 106 may sequentially utilize one or more client applications to interact with the server 120 to utilize the services provided by these components. It should be understood that a variety of different system configurations are possible, which may be different from the system 100. Therefore, FIG. 1 is an example of a system for implementing the various methods described herein and is not intended to be limiting.

The client devices 101, 102, 103, 104, 105, and/or 106 may provide an interface that enables the user of the client devices to interact with the client devices. The client devices may also output information to the user via the interface. Although FIG. 1 depicts only six client devices, those skilled in the art will be able to understand that the present disclosure may support any number of client devices.

The client devices 101, 102, 103, 104, 105, and/or 106 may include various types of computer devices, such as portable handhold devices, general-purpose computers (such as personal computers and laptop computers), workstation computers, wearable devices, smart screen devices, self-service terminal devices, service robots, gaming systems, thin clients, various messaging devices, sensors, or other sensing devices, and the like. These computer devices may run various types and versions of software applications and operating systems, such as Microsoft Windows, Apple IOS, Unix-like operating systems, Linux or Linux-like operating systems; or include various mobile operating systems, such as Microsoft Windows Mobile OS, iOS, Windows Phone, Android. The portable handhold devices may include cellular telephones, smart phones, tablet computers, personal digital assistants (PDA), and the like. The wearable devices may include head-mounted displays, such as smart glasses, and other devices. The gaming systems may include various handhold gaming devices, Internet-enabled gaming devices, and the like. The client devices can perform various different applications, such as various applications related to the Internet, communication applications (e.g., e-mail applications), Short Message Service (SMS) applications, and may use various communication protocols.

The network 110 may be any type of network well known to those skilled in the art, which may support data communication using any of a variety of available protocols (including but not limited to TCP/IP, SNA, IPX, etc.). By way of example only, one or more networks 110 may be a local area network (LAN), an Ethernet-based network, a token ring, a wide area network (WAN), an Internet, a virtual network, a virtual private network (VPN), an intranet, an external network, a blockchain network, a public switched telephone network (PSTN), an infrared network, a wireless network (for example, Bluetooth, WiFi), and/or any combination of these and/or other networks.

The server 120 may include one or more general-purpose computers, a dedicated server computer (e.g., a PC (personal computer) server, a UNIX server, a mid-end server), a blade server, a mainframe computer, a server cluster, or any other suitable arrangement and/or combination. The server 120 may include one or more virtual machines running a virtual operating system, or other computing architectures involving virtualization (e.g., one or more flexible pools of a logical storage device that may be virtualized to maintain virtual storage devices of a server). In various embodiments, the server 120 may run one or more services or software applications that provide the functions described below.

The computing unit in the server 120 may run one or more operating systems including any of the operating systems described above and any commercially available server operating system. The server 120 may also run any of a variety of additional server applications and/or intermediate layer applications, including a HTTP server, an FTP server, a CGI server, a Java server, a database server, etc.

In some implementations, the server 120 may include one or more applications to analyze and merge data feeds and/or event updates received from the user of the client devices 101, 102, 103, 104, 105, and/or 106. The server 130 may also include one or more applications to display the data feeds and/or the real-time events via one or more display devices of the client devices 101, 102, 103, 104, 105, and/or 106.

In some embodiments, the server 120 may be a server of a distributed system, or a server incorporating a block chain. The server 120 may also be a cloud server, or an intelligent cloud computing server or an intelligent cloud host with an artificial intelligence technology. The cloud server is a host product in a cloud computing service system to overcome the defects of management difficulty and weak service expansibility exiting in a traditional physical host and virtual private server (VPS) service.

The system 100 may also include one or more databases 130. In certain embodiments, these databases may be used to store data and other information. For example, one or more of the databases 130 may be used to store information such as audio files and video files. The databases 130 may reside in various locations. For example, the database used by the server 120 may be local to the server 120, or may be remote from the server 120 and may communicate with the server 120 via a network-based or dedicated connection. The databases 130 may be of different types. In some embodiments, the database used by the server 120 may be, for example, a relational database. One or more of these databases may store, update, and retrieve data to and from the database in response to a command.

In some embodiments, one or more of the databases 130 may also be used by an application to store application data. The databases used by the application may be different types of databases, such as a key-value repository, an object repository, or a conventional repository supported by a file system.

The system 100 of FIG. 1 may be configured and operated in various ways to enable application of various methods and apparatuses described according to the present disclosure.

According to some embodiments, the client devices 101-106 may execute the image editing method of the embodiments of the present disclosure to provide immersive image editing services for the user. Specifically, the user can input the image processing instruction (i.e., the query) of each round of dialogue by operating the client devices 101-106 (e.g., operating the input device such as a mouse, a keyboard, a touch screen, etc.) to express his or her requirement for image creation or image editing. In the case where the user expresses an image creation requirement, the client devices 101-106 generate a brand new target image for the user. In the case where the user expresses an image editing requirement, the client devices 101-106 determine, by performing the image editing method of the embodiments of the present disclosure, a source image to be edited from generated history images or history images uploaded by the user, and generate a target image by editing the source image. The client devices 101-106 further output (e.g., via a display) the generated target image to the user as the response data (i.e., the response) of the current round of dialogue. According to some embodiments, the response data of the current round of dialogue may also include an explanation text of the target image, and the explanation text may be, for example, a description text for describing the image content of the target image, a text for describing the process and logic of the system for generating the target image, and the like.

According to some embodiments, the server 120 may also perform the image editing method according to embodiments of the present disclosure. Specifically, the user can input the image processing instruction (i.e., the query) of each round of dialogue by operating the client devices 101-106 (e.g., operating the input device such as a mouse, a keyboard, a touch screen, etc.) to express his or her requirement for image creation or image editing. The client devices 101-106 send the image processing instruction of each round of the dialogue of the user to the server 120. In the case where the image processing instruction of the user expresses an image editing requirement, the server 120 determines, by performing the image editing method of embodiments of the present disclosure, a source image to be edited from history images generated in the current dialogue or uploaded by the user, and generates a target image by editing the source image, and outputs the target image to the client devices 101-106 as the response data of the current round of dialogue. The client devices 101-106 further output (e.g., via a display) the response data to the user. According to some embodiments, the response data of the current round of dialogue may also include an explanation text of the target image, which may be, for example, a description text for describing the image content of the target image, a text for describing the process and logic of the system for generating the target image, and the like.

FIG. 2 illustrates a flowchart of an image editing method 200 according to embodiments of the present disclosure. As described above, the execution body of the method 200 may be a client device, such as the client devices 101-106 shown in FIG. 1; or a server, such as the server 120 shown in FIG. 1.

As shown in FIG. 2, the method 200 includes steps S210-S230.

In step S210, obtaining an editing instruction input by a user in a current round of a dialogue and history dialogue information in at least one history round of the dialogue. The history dialogue information includes a history dialogue text and at least one history image.

In step S220, determining a source image to be edited from the at least one history image based on the editing instruction and the history dialogue information.

In step S230, editing the source image to generate a target image based on the editing instruction.

According to embodiments of the present disclosure, a multi-round conversational image editing method is provided. By combining history dialogue information, the editing object (i.e., the source image), to which the current editing instruction of the user is directed, is accurately understood, and then the source image is edited based on the editing instruction of the user to generate the target image. The embodiments of the present disclosure understand and meet the image editing requirement of the user by a unified and natural multi-round dialogue approach, which significantly reduces the operation complexity for the user and improves the image editing efficiency and the user experience.

Each step of the method 200 is described in detail below.

In step S210, obtaining an editing instruction input by a user in a current round of dialogue and history dialogue information in at least one history round of the dialogue.

In embodiments of the present disclosure, a dialogue refers to an interaction process in which a user inputs a question (the query) and an AI image generation system outputs an answer (the response). According to different number of interactions between the user and the AI image generation system, the dialogue can be categorized as a single-round dialogue and a multi-round dialogue. In a single-round dialogue, the user interacts with the AI image generation system only once. The dialogue ends after the user inputs a question and obtains an answer output from the system. In a multi-round dialogue, the user interacts with the AI image generation multiple times. Each interaction is referred to as a "round" of the dialogue, which consists of a question input by the user and a response output by the system with respect to that question.

In embodiments of the present disclosure, the current round of a dialogue may be any one of the multiple rounds of the dialogue other than the first round, for example, it may be the second round of the dialogue, the third round of the dialogue, etc.

The history dialogue information includes a history dialogue text and at least one history image. The history dialogue text includes the user input text and the system response text in the history rounds of the dialogue. The at least one history image includes the user input images and the system response images in the history rounds of the dialogue.

The editing instruction input by the user in the current round of the dialogue is used to express the current image editing requirement of the user. The editing instruction can directly or indirectly refer to history images. For example, the editing instruction may be, for example, "make the first image be more scientific", "put a hat on the puppy in the image", "redraw another similar set", and the like.

According to some embodiments, the text input by the user in the current round of the dialogue can be used as the editing instruction.

According to other embodiments, speech recognition can be performed on the voice input by the user in the current round of the dialogue to obtain a result text, and the result text can be used as the editing instruction.

It should be noted that the input data of the user in the current round of the dialogue does not necessarily always express an image editing requirement, but may also express other requirements, such as an image creation requirement, a casual conversation, an inquiry about how to use the various functions of the AI image generation system, etc. It can be understood that only if the input data of the user expresses an image editing requirement, the input data belongs to an editing instruction. If the input data of the user expresses a non-image editing requirement, the input data does not belong to an editing instruction.

According to some embodiments, intent recognition can be performed on the input data of the user in the current round of the dialogue to determine whether the user currently has an image editing requirement, that is, to determine whether the current input data is an editing instruction.

Specifically, the input data of the user in the current round of dialogue and the history dialogue information in the history rounds of the dialogue may be obtained. Based on the input data and the history dialogue information, the intent of the user in the current round of the dialogue is recognized. In response to the intent being an image editing intent, the input data of the current round of the dialogue is used as the editing instruction.

According to the above embodiments, the image editing requirement of the user can be accurately recognized, and the unnecessary image editing process can be avoided, thereby improving the image editing efficiency and the image editing experience of the user.

According to some embodiments, a set large language model may be utilized to identify the intent of the user. For example, the input data of the user in the current round of the dialogue and the history dialogue information may be filled into a set prompt template to obtain input information for the large language model. The input information is input into the large language model to obtain an intent recognition result output by the large language model.

In step S220, determining, based on the editing instruction and the history dialogue information, a source image to be edited from the at least one history image.

In a multi-round dialogue, the editing instruction currently input by the user is usually related to the history dialogue contents, and the editing requirement may be gradually clarified over multiple rounds of input. Therefore, it is necessary to combine the history dialogue information to accurately understand the editing object (i.e., the source image to be edited) to which the user's current editing instruction refers.

According to some embodiments, in step S220, a set large language model may be utilized to determine the source image. Step S220 may include steps S221-S223.

In step S221, obtaining a set prompt template. The prompt template includes a guide text for guiding the language model to determine the source image to be edited from the at least one history image and slots to be filled.

In step S222, filling the editing instruction and the history dialogue information into the slots to obtain input information.

In step S223, inputting the input information into the language model to obtain the source image output by the language model. Specifically, the language model can output an identification (ID) of the source image.

According to the above embodiments, the image editing requirement of the user can be accurately understood by utilizing the language understanding capability of the large language model, thereby ensuring the accuracy of image editing.

According to some embodiments, the prompt template may be, for example, "The current editing instruction of the user: {the editing instruction} \n History dialogue text: {the history dialogue text} \n History image: {the history image} \n The image to be edited by the user is: {the source image}". In the above prompt template, {the editing instruction}, {the history dialogue text}, and {the history image} are the slots for filling the editing instruction, the history dialogue text, and the history image, respectively, and {the source image} is the output result of the large language model.

According to some embodiments, before the execution of steps S221-S223, high-quality labeled data for "editing instruction-history dialogue information-source image" can be manually constructed, and the pre-trained large language model can be fine-tuned using the labeled data to improve the accuracy of the large language model in recognizing the source image.

According to some embodiments, a trained image-text matching model may also be utilized to determine the source image. The image-text matching model includes a text encoder and an image encoder, and the text encoder and the image encoder can encode the text and the image into the same semantic space.

Specifically, in step S220, encoding, by utilizing the text encoder in the image-text matching model, the editing instruction to obtain a vector representation of the editing instruction. For each history image, the image encoder is utilized to encode the history image to obtain an initial vector representation of the history image. If there is no explanatory text for the history image, the initial vector representation is the final vector representation of the history image. If there is an explanatory text for the history image, the text encoder is further utilized to encode the explanatory text to obtain the vector representation of the explanatory text, and then the initial vector representation of the history image and the vector representation of the explanatory text are fused (e.g., summed, averaged, fused by an attention mechanism, etc.) to obtain a final vector representation of the history image. The similarity (e.g., cosine similarity) between the vector representation of the editing instruction and the vector representation of each history image is calculated, and the history image with the largest similarity is determined as the source image to be edited.

After determining the source image to be edited in step S220, step S230 is performed. In step S230, editing, based on the editing instruction, the source image to generate a target image.

According to some embodiments, step S230 may include steps S231-S233.

In step S231, obtaining a source description text of the source image.

In step S232, determining, based on the source description text and the editing instruction, a target description text of the target image.

In step S233, generating the target image based on the target description text. The source description text is used to control the above process for generating the target image.

According to the above embodiments, the process for generating the target image is controlled by utilizing the source description text, so that the image editing effect desired by the user can be achieved on the premise of keeping the target image as similar as possible to the source image.

According to some embodiments, the description text of each history image can be stored in advance. Accordingly, in step S231, the description text corresponding to the source image can be obtained from the stored description texts as the source description text.

According to some embodiments, the source image may be the image generated by the AI image generation system by calling a text-to-image model in the history rounds of the dialogue, that is, the source image output by the text-to-image model is obtained by inputting the specified description text (prompt text) into the text-to-image model. In this case, the source description text is the description text which is input into the text-to-image model for generating the source image.

According to other embodiments, the source image may also be the image being actively uploaded by the user in the history rounds of the dialogue. In this case, the description text of the image (i.e., the source description text) can be generated by calling a large language model when the user uploads that image.

According to some embodiments, in step S232, a large language model may be utilized to generate the target description text. Specifically, based on the editing instruction, the source description text can be rewritten by using the language model to obtain the target description text. According to the embodiment, the language understanding ability and text generation ability of the large language model can be utilized to achieve intelligent rewriting, the image editing requirement of the user can be deeply understood, thereby improving the image editing effect.

According to some embodiments, a set prompt template for guiding the large language model to generate the target description text can be obtained. The prompt template includes slots to be filled. The prompt template may be, for example, "Source description text: {the source description text} \n Editing instruction: {the editing instruction} \n Target description text: {the target description text}", "Source description text: {the source description text} \n Editing instruction: {the editing instruction} \n History dialogue text: {the history dialogue text} \n History image: {the history image} \n Target description text: {the target description text}" and the like.

The input information to the large language model is obtained by filling the source description text and the editing instruction (or sometimes together with the history dialogue information, depending on the requirements of the prompt template) into the corresponding slots. The input information is then input into the large language model to obtain the target description text output by the large language model.

Prompt template is used to guide the large language model to perform specific tasks (e.g., determine the source image, generate the target description text, etc.) and output specific data (e.g., source image ID, target description text, etc.). Generally, each template includes guidance information for guiding the large language model to perform a specific task and one or more slots for filling the related data needed by the large language model to perform the task. It should be noted that different tasks may use different templates. The templates may be preset, dynamically set, experimentally set, or set in other approaches, which are all included in the scope of the disclosure.

According to some embodiments, in step S233, a set text-to-image diffusion model can be utilized to generate the target image. The text-to-image diffusion model includes a text encoder and a noise generation network. The model receives a text input and generates an image that conforms to the text condition.

The text-to-image diffusion model generates images through a reverse diffusion process, which includes a plurality of iterations. The text-to-image diffusion model gradually denoises an initial image (which could be a pure-noise image) through the plurality of iterations, and finally obtains a clear result image. During the inverse diffusion process, the given text is encoded as a high-dimensional text feature vector by the text encoder, which is used to guide the noise generation network to generate a noise that conforms to the text condition, and then an image that conforms to the text condition is obtained by sequentially subtracting the noise generated in each iteration from the initial image. Each iteration in the inverse diffusion process needs to sample values of some random variables (usually are random noise), thereby each iteration has certain degree of randomness.

According to some embodiments, step S233 may include steps S2331 and S2332.

In step S2331, denoising, based on the source description text, a first initial image by performing a plurality of first iterations using a text-to-image diffusion model, and recording random variable values sampled in each first iteration of the plurality of first iterations.

In step S2332, denoising, based on the target description text, a second initial image by performing a plurality of second iterations using the text-to-image diffusion model to generate the target image. Each second iteration of the plurality of second iterations reuses the random variable values sampled in a first iteration of a corresponding round.

According to the above embodiments, the denoising process (the inverse diffusion process) of each iteration of the source image is simulated using the text-to-image diffusion model, and the randomness factors implied in the source image are estimated, that is, what kind of random variables should be sampled in each iteration if the source image is generated by this text-to-image diffusion model. A large amount of information about the source image is implied in these random variables.

In the process of generating the target image, reusing the random variable values sampled when generating the source image can make the target image maintain the content details of the source image. At the same time, the editing effect desired by the user can be achieved by generating the target image based on the target description text.

In addition, the text-to-image diffusion model in the above embodiments may be any existing text-to-image diffusion model. The above embodiments can achieve the editing effect desired by the user on the premise of keeping the target image and the source image as similar as possible by controlling the inference process of the text-to-image diffusion model. There is no need to additionally construct large-scale training data to train the text-to-image diffusion model, thereby the general image editing capability can be achieved at a low cost and the mobility between multiple text-to-image diffusion models can be provided.

It should be noted that the terms "first" and "second" in the foregoing embodiments are used to distinguish the image generation process using the source description text as the condition and the image generation process using the target description text as the condition. The "first iteration" denotes one iteration in the image generation process which uses the source description text as the condition, and the "second iteration" denotes one iteration in the image generation process which uses the target description text as the condition.

According to some embodiments, the text-to-image diffusion model includes a text encoder and a noise generation network.

According to some embodiments, in step S2331, the first initial image may be a random noise image. The image may be generated by randomly sampling in a set noise distribution, such as a Gaussian distribution.

According to some embodiments, each first iteration in step S2331 may include the following steps S23311-S23314.

In step S23311, inputting the source description text into the text encoder to generate a source text vector corresponding to the source description text.

In step S23312, obtaining, by sampling in a set noise distribution (e.g., a Gaussian distribution), the random variable values sampled in a first iteration, i.e., the initial sampled noise. The sampled random variable values may be a random variable image of the same size as the first initial image.

The noise distribution may be preset, dynamically set, experimentally set, or set in other approaches, which are all included in the scope of the disclosure.

In step S23313, inputting the source text vector and the sampled random variable values into the noise generation network to obtain a predicted noise of a current image. The predicted noise may be a noise image of the same size as the current image.

In step S23314, removing the predicted noise from the current image to obtain a result image of the first iteration.

It should be understood that the current image in the first first iteration is the first initial image, and the current image in the second and each subsequent first iteration is the result image generated in the previous first iteration.

It should be noted that step S2331 (including steps S23311-S23314) is used to simulate the denoising process of each iteration of the source image, but the image ultimately generated by this step (i.e., the result image generated in the last first iteration) is not necessarily the same as the source image.

According to some embodiments, in step S2332, the second initial image may be generated based on the source image. This enables the second initial image to contain information of the source image so that the generated target image remains consistent with the source image as much as possible.

According to some embodiments, the second initial image may be the source image itself, such that the second initial image retains all of the information of the source image.

According to other embodiments, the second initial image may be obtained by adding noise (e.g., random noise that conforms to the Gaussian distribution) to the source image. This enables the target image to remain similar to the source image in terms of overall visual effect, including color, composition, style, etc., and improves the diversity and richness of the target image.

According to some embodiments, each second iteration in step S2332 may include steps S23321-S23323.

In step S23321, inputting the target description text into the text encoder to generate a target text vector corresponding to the target description text.

In step S23322, inputting the target text vector and the random variable values sampled in the first iteration of the corresponding round into the noise generation network to obtain a predicted noise of a current image.

In step S23323, removing the predicted noise from the current image to obtain a result image of the second iteration. The current image in the first second iteration is the second initial image, and the current image in the second and each subsequent second iteration is the result image generated in the previous second iteration.

According to the above embodiments, in the process of generating the target image using the target description text as the condition, reusing the random variable values sampled when generating the source image enables the achievement of the editing effect desired by the user on the premise of keeping the target image as similar as possible to the source image.

Figure 3:
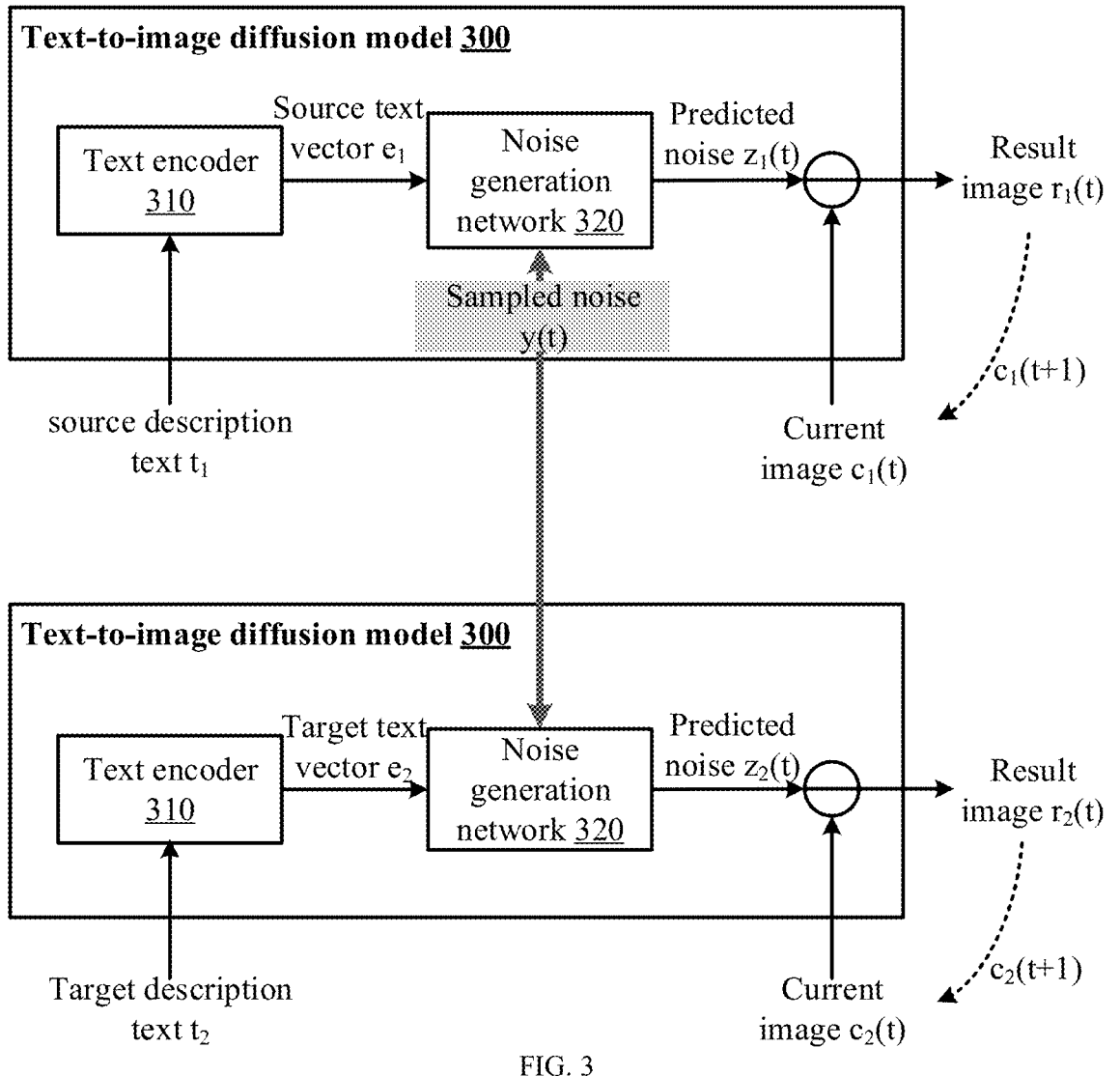
FIG. 3 illustrates a schematic diagram of the t-th iteration of a text-to-image diffusion model according to embodiments of the present disclosure.

FIG. 3 illustrates a schematic diagram of the t-th iteration of a text-to-image diffusion model 300 according to embodiments of the present disclosure. The text-to-image diffusion model 300 includes a text encoder 310 and a noise generation network 320. The upper part of FIG. 3 illustrates the t-th iteration of an inverse-diffusion process with the source description text $t_1$ as the condition, i.e., the t-th first iteration; the lower part of FIG. 3 illustrates the t-th iteration of an inverse-diffusion process with the target description text as the condition, i.e., the t-th second iteration.

As shown in the upper part of FIG. 3, in the t-th iteration of the inverse diffusion process with the source description text $t_1$ as the condition, the source description text $t_1$ is input into the text encoder 310 to obtain the source text vector $e_1$. The sampled noise y(t) of the current iteration is generated by sampling in a set noise distribution (e.g., a Gaussian distribution). The source text vector $e_1$ and the sampled noise y(t) are input into the noise generation network 320 to obtain the predicted noise $z_1(t)$ of the current iteration. The difference between the current image $c_1(t)$ and the predicted noise $z_1(t)$ is made to obtain the result image $r_1(t)$. It should be understood that the result image $r_1(t)$ of the current iteration is the current image $c_1(t+1)$ of the next iteration.

As shown in the lower part of FIG. 3, in the t-th iteration of the inverse diffusion process with the target description text $t_2$ as the condition, the target description text $t_2$ is input into the text encoder 310 to obtain the target text vector $e_2$. The sampled noise y(t) of the t-th iteration of the inverse diffusion process with the source description text $t_1$ as the condition is reused, the target text vector $e_2$ and the sampled noise y(t) are inputted into the noise generating network 320 to obtain the predicted noise $z_2(t)$ of the current iteration. The difference between the current image $c_2(t)$ and the predicted noise $z_2(t)$ is made to obtain the result image $r_2(t)$. It should be understood that the result image $r_2(t)$ of the current iteration is the current image $c_2(t+1)$ of the next iteration. After all the T iterations are completed, the generated result image is the target image.

According to some embodiments, in step S230, a trained language instruction driven image editing model may also be utilized to generate the target image. Specifically, the editing instruction and the source image are input into the image editing model to obtain the target image output by the image editing model.

It should be noted that the image editing model in the above embodiments is obtained by training using a large number of sample data of "editing instruction-source image-target image". As the labeling of the sample data and the training of the model need to consume a lot of manpower and time costs, the universality and mobility are not good.

Figure 4:
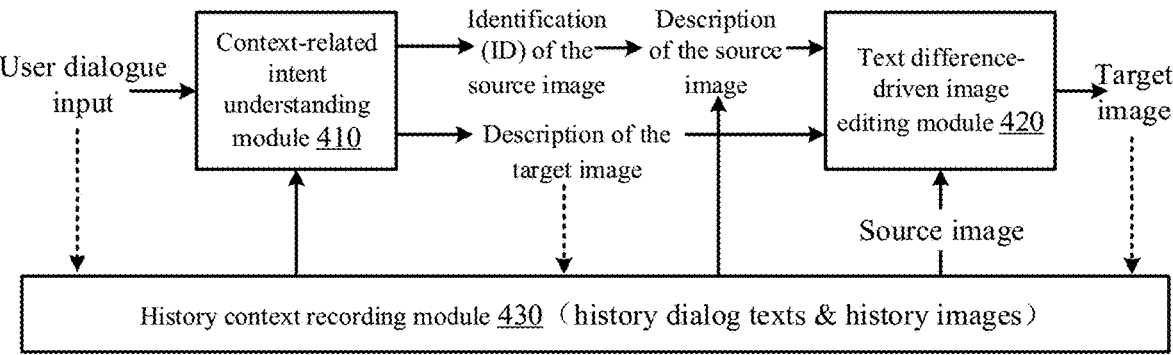
FIG. 4 illustrates a schematic diagram of an image editing process according to embodiments of the present disclosure.

FIG. 4 illustrates a schematic diagram of an image editing process according to embodiments of the present disclosure. The image editing process shown in FIG. 4 is implemented by an AI image generation system. The AI image generation system includes a context-related intent understanding module 410, a text difference-driven image editing module 420, and a history context recording module 430. The history context recording module 430 is used to store, at the end of each round of dialogue, relevant information of the current round of the dialogue (including the dialogue text, the generated image, the description of the image, etc.) as history dialogue information.

As shown in FIG. 4, the context-related intent understanding module 410 obtains a dialogue input of the current round of the user (i.e., the editing instruction), obtains history dialogue information from the history context recording module 430, understands the image editing intent of the user by calling a large language model, and determines an identification (ID) of the source image to be edited and a description of the target image (i.e., the target description text). Based on the identification of the source image, a source image and a description of the source image (i.e., the source description text) are obtained from the history context recording module 430.

The text difference-driven image editing module 420 takes the description of the source image, the description of the target image, and the source image as input to generate a target image and return it to the user. The text difference-driven image editing module 420 can achieve, by controlling the inference process of the text-to-image diffusion model, the editing effect desired by the user on the premise of keeping the generated target image as similar as possible to the source image.

At the end of the current round of the dialogue, the dialogue input of the current round of the user, the description of the target image, and the generated target image are stored in the history context recording module 430 for subsequent rounds of the dialogue.

Figure 5:
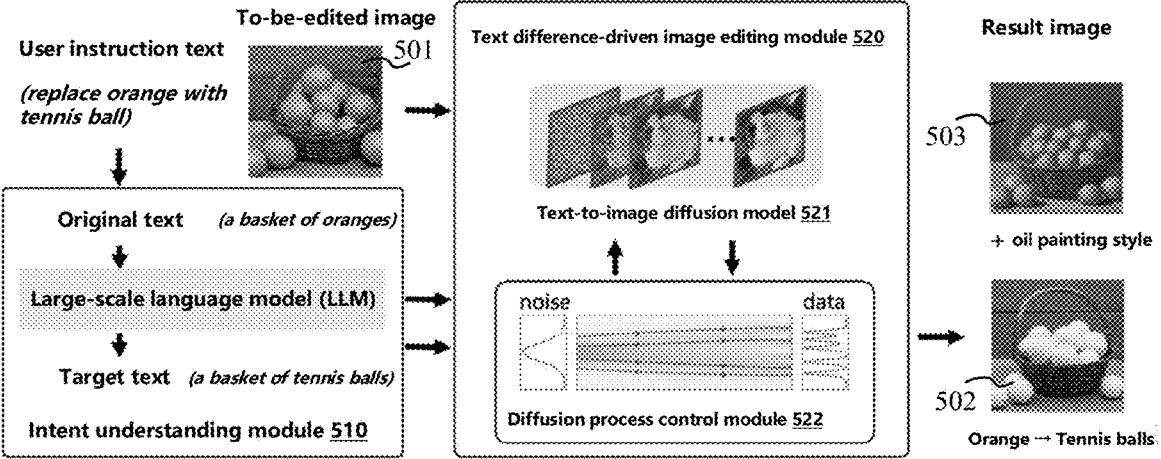
FIG. 5 illustrates a schematic diagram of an example of image editing according to embodiments of the present disclosure.

FIG. 5 illustrates a schematic diagram of an example of image editing according to embodiments of the present disclosure. As shown in FIG. 5, the text editing instruction input by the user in the current round of dialogue is "replace orange with tennis ball". The intent understanding module 510 first determines, by calling the large language model, the to-be-edited image 501 (i.e., the source image) from the history images that have been generated in the dialogue, and obtains the original text corresponding to the to-be-edited image 501 (i.e., the source description text) "a basket of oranges".

The intent understanding module 510 utilizes the large-scale language model (i.e., the large language model) to rewrite, based on the current editing instruction text "replace orange with tennis ball", the original text "a basket of oranges" to obtain the target text (i.e., the target description text) "a basket of tennis balls".

The to-be-edited image 501, the original text "a basket of oranges" and the target text "a basket of tennis balls" are input into the text difference-driven image editing module 520 to generate the result image (i.e., the target image) 502.

The text difference-driven image editing module 520 includes a text-to-image diffusion model 521 and a diffusion process control module 522.

The text-to-image diffusion model 521 includes a text encoder and a noise generation network. The model receives a text input and generates an image that conforms to the text condition.

The diffusion process control module 522 maintains the similarity between the result image 502 and the to-be-edited image 501 to the greatest extent by controlling the randomness of the inverse diffusion process of the text-to-image diffusion model 521, while satisfying the editing requirements of the user. The diffusion process control module 522 may include a randomness estimation sub-module and an image-to-image sub-module.

The randomness estimation sub-module aims to inversely estimate the randomness factors implied in the image to be edited. In other words, if the image to be edited is generated by the text-to-image diffusion model 521, the randomness estimation sub-module estimates what kind of random variables (random noise) should be sampled in each iteration of the inverse diffusion process. A large amount of information of the image to be edited is implied in these random variables. The randomness estimation sub-module takes the random noise image as the starting point, takes the original text "a basket of oranges" as the condition, simulates the denoising process of each iteration of the to-be-edited image 501, and records the random variable values sampled in each iteration.

The image-to-image sub-module is designed to generate an image that is similar to the to-be-edited image 501 and at the same time meets the editing requirements of the user. To achieve the preservation of the image to be edited, on one hand, the inverse diffusion process is initialized by adding noise to the to-be-edited image 501, so as to maintain the overall visual effect of the to-be-edited image 501, such as color, composition, etc.; on the other hand, the random variable values sampled by the randomness estimation sub-module are reused in the inverse diffusion process of the result image 502, so as to maintain more content details of the to-be-edited image 501. To meet the editing requirements of the user and achieve the editing effect desired by the user, the text condition is replaced with the target text "a basket of tennis balls".

In other examples, the editing instruction text input by the user in the current round of the dialogue may also be "change to oil painting style". Through the corresponding processing of the intent understanding module 510 and the text difference-driven image editing module 520, the to-be-edited image 501 can be determined and modified to oil painting style to obtain the result image 503.

Figure 6:
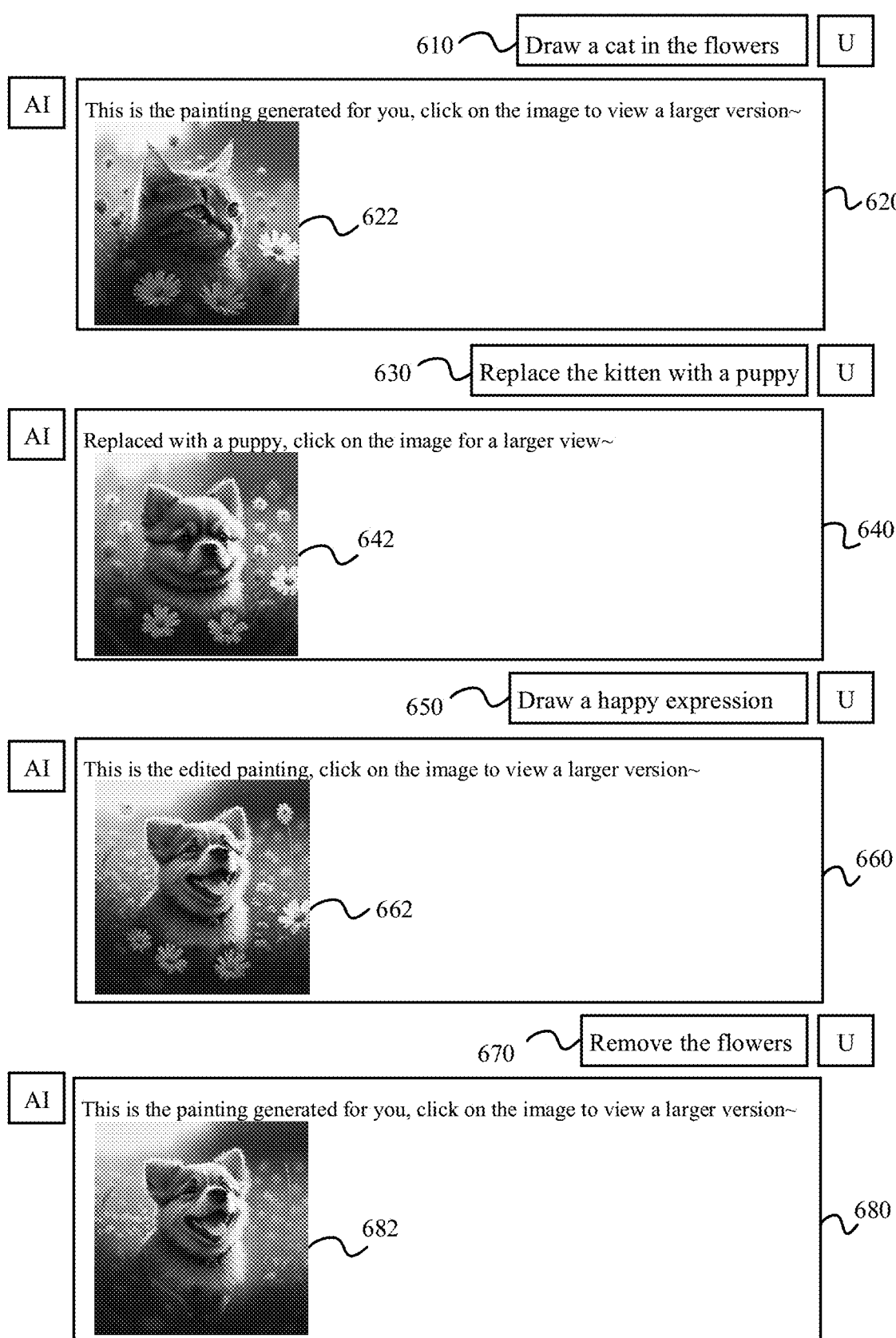
FIG. 6 illustrates a schematic diagram of the effect of a multi-round conversational image editing according to embodiments of the present disclosure.

FIG. 6 illustrates a schematic diagram of the image editing effect of a multi-round dialogue approach according to embodiments of the present disclosure. In FIG. 6, U and AI are two parties in the dialogue, where U represents a user and AI represents an AI image generation system (which may also be referred to as an "AI drawing assistant").

As shown in FIG. 6, in the first round of the dialogue, the user inputs a natural language instruction 610 "Draw a cat in the flowers". The instruction 610 expresses an image creation requirement of the user. In response to the instruction 610, the AI image generation system generates a brand new image 622 and its explanatory text "This is the painting generated for you, click on the image to view a larger version~" for the user, and takes the combination of image 622 and its explanatory text as the response 620 to the user instruction 610.

In the second round of the dialogue, the user inputs a natural language instruction 630 "replace the kitten with a puppy". The instruction 630 expresses an image editing requirement of the user. In response to the instruction 630, the AI image generation system determines the image to be edited as the image 622 by using the method 200 according to the embodiments of the present disclosure, and edits the image 622 to generate the image 642. Furthermore, the AI image generation system can generate the explanatory text of the image 642 "Replaced with a puppy, click on the image for a larger view~" by calling a large language model, and takes the combination of the image 642 and its explanatory text as the response 640 to the user instruction 630. As shown in FIG. 6, the newly generated image 642 is highly consistent with the original image 622 in terms of color, style, position of the elements (flowers, animals, etc.) and the like, and at the same time the kitten in the original image 622 is replaced with a puppy to meet the editing requirement of the user.

In the third round of the dialogue, the user inputs a natural language instruction 650 "draw a happy expression". The instruction 650 expresses an image editing requirement of the user. In response to the instruction 650, the AI image generation system determines that the image to be edited is the image 642 by using the method 200 according to embodiments of the present disclosure, and edits the image 642 to generate the image 662. Furthermore, the AI image generation system can generate the explanatory text of the image 662 "This is the edited painting, click on the image to view a larger version~" by calling the large language model, and takes the combination of image 662 and its explanatory text as the response 660 to the user instruction 650. As shown in FIG. 6, the newly generated image 662 is highly consistent with the original image 642 in terms of color, style, composition, etc., and the puppy in the original image 642 is modified from a sad expression to a happy one to meet the editing requirements of the user.

In the fourth round of the dialogue, the user inputs a natural language instruction 670 "remove the flowers". The instruction 670 expresses an image editing requirement of the user. In response to the instruction 670, the AI image generation system determines that the image to be edited is image 662 by using the method 200 according to embodiments of the present disclosure, and edits the image 662 to generate image 682. Furthermore, the AI image generation system can generate the explanatory text of the image 682 "This is the painting generated for you, click on the image to view a larger version~" by calling the large language model, and takes the combination of image 682 and its explanatory text as the response 680 to the user instruction 670. As shown in FIG. 6, the newly generated image 682 is highly consistent with the original image 662 in terms of color, style, composition, etc., and at the same time the flowers in the original image 662 have been removed to meet the editing requirement of the user.

Figure 7:
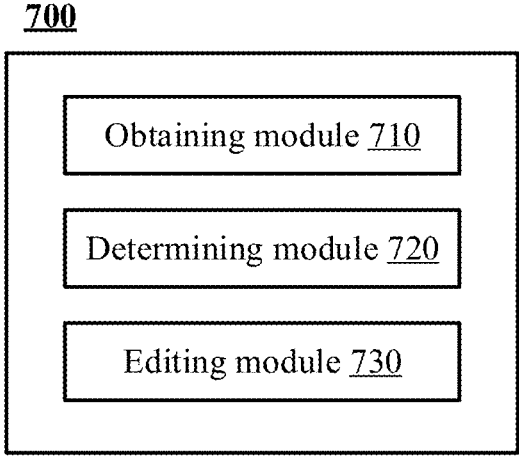
FIG. 7 illustrates a structural block diagram of an image editing apparatus according to embodiments of the present disclosure.

According to embodiments of the present disclosure, an image editing apparatus is also provided. FIG. 7 illustrates a structural block diagram of an image editing apparatus 700 according to embodiments of the present disclosure. As shown in FIG. 7, the device 700 includes an obtaining module 710, a determining module 720, and an editing module 730.

The obtaining module 710 is configured to obtain an editing instruction input by a user in a current round of a dialogue and history dialogue information in history rounds of the dialogue, wherein the history dialogue information comprises a history dialogue text and at least one history image.

The determining module 720 is configured to determine a source image to be edited from the at least one history image based on the editing instruction and the history dialogue information.

The editing module 730 is configured to edit the source image to generate a target image based on the editing instruction.

According to embodiments of the present disclosure, a multi-round conversational image editing method is provided. By combining history dialogue information, the editing object (i.e., the source image), to which the current editing instruction of the user is directed, is accurately understood, and then the source image is edited based on the editing instruction of the user to generate the target image. The embodiments of the present disclosure understand and meet the image editing requirement of the user by a unified and natural multi-round dialogue approach, which significantly reduces the operation complexity for the user and improves the image editing efficiency and the user experience.

According to some embodiments, the determining module comprises: a first obtaining unit configured to obtain a set prompt template, wherein the prompt template comprises a guide text for guiding a language model to determine the source image to be edited from the at least one history image and slots to be filled; a filling unit configured to fill the editing instruction and the history dialogue information into the slots to obtain input information; and an input unit configured to input the input information into the language model to obtain the source image output by the language model.

According to some embodiments, the editing module comprises: a second obtaining unit configured to obtain a source description text of the source image; a determining unit configured to determine a target description text of the target image based on the source description text and the editing instruction; and a generating unit configured to generate the target image based on the target description text, wherein the source description text is used to control the process for generating the target image.

According to some embodiments, the determining unit is further configured to: rewrite, based on the editing instruction, the source description text using a language model to obtain the target description text.

According to some embodiments, the generating unit comprises: a simulating sub-unit configured to denoise, based on the source description text, a first initial image by performing a plurality of first iterations using a text-to-image diffusion model, and to record random variable values sampled in each first iteration of the plurality of first iterations; and a generating sub-unit configured to denoise, based on the target description text, a second initial image by performing a plurality of second iterations using the text-to-image diffusion model to generate the target image, wherein each second iteration of the plurality of second iterations reuses the random variable values sampled in a first iteration of a corresponding round.

According to some embodiments, the text-to-image diffusion model comprises a text encoder and a noise generation network, and each of the plurality of second iterations comprises: inputting the target description text into the text encoder to generate a target text vector corresponding to the target description text; inputting the target text vector and the random variable values sampled in the first iteration of the corresponding round into the noise generation network to obtain a predicted noise of a current image; and removing the predicted noise from the current image to obtain a result image of the second iteration, wherein the current image in a first second iteration is the second initial image, and the current image in a second second iteration or each subsequent second iteration is the result image generated in a previous second iteration.

According to some embodiments, the second initial image is generated based on the source image.

According to some embodiments, the second initial image is obtained by adding noise to the source image.

It should be understood that the various modules and units of the apparatus 700 shown in FIG. 7 may correspond to the various steps in the method 200 described with reference to FIG. 2. Therefore, the operations, features, and advantages described above with respect to the method 200 are equally applicable to the apparatus 700 and the modules and units included therein. For the sake of brevity, certain operations, features and advantages are not repeated herein.

Although specific functions are discussed above with reference to particular modules, it should be noted that the functionality of the various modules discussed herein may be divided into multiple modules, and/or at least some of the functions of the multiple modules may be combined into a single module.

It should also be understood that various techniques may be described herein in the general context of software hardware elements or program modules. The various units described above with respect to FIG. 7 may be implemented in hardware or in hardware that combines software and/or firmware. For example, these units may be implemented as computer program code/instructions, which are configured to be executed in one or more processors and stored in a computer readable storage medium. Alternatively, these units may be implemented as hardware logic/circuitry. For example, in some embodiments, one or more of modules 710-730 may be implemented together in a System on Chip (SoC). The SoC may include an integrated circuit chip (which includes a processor (e.g., a Central Processing Unit (CPU), a microcontroller, a microprocessor, a digital signal processor (DSP), memory, one or more communication interfaces, and/or one or more components of the other circuitries), and may optionally execute received program code and/or may include embedded firmware to perform functions.

According to embodiments of the present disclosure, an electronic device is also provided, comprising: at least one processor; and a memory communicatively connected to the at least one processor, the memory stores instructions executable by the at least one processor, the instruction, when executed by the at least one processor, cause the at least one processor to carry out the method according to the embodiments of the present disclosure.

According to embodiments of the present disclosure, a non-transitory computer-readable storage medium is also provided. The storage medium stores computer instructions which are configured to enable a computer to carry out the method according to the embodiments of the present disclosure.

According to embodiments of the present disclosure, a computer program product is also provided. The computer program product includes computer program instructions, and the computer program instructions, when executed by a processor, implement the method according to the embodiments of the present disclosure.

Figure 8:
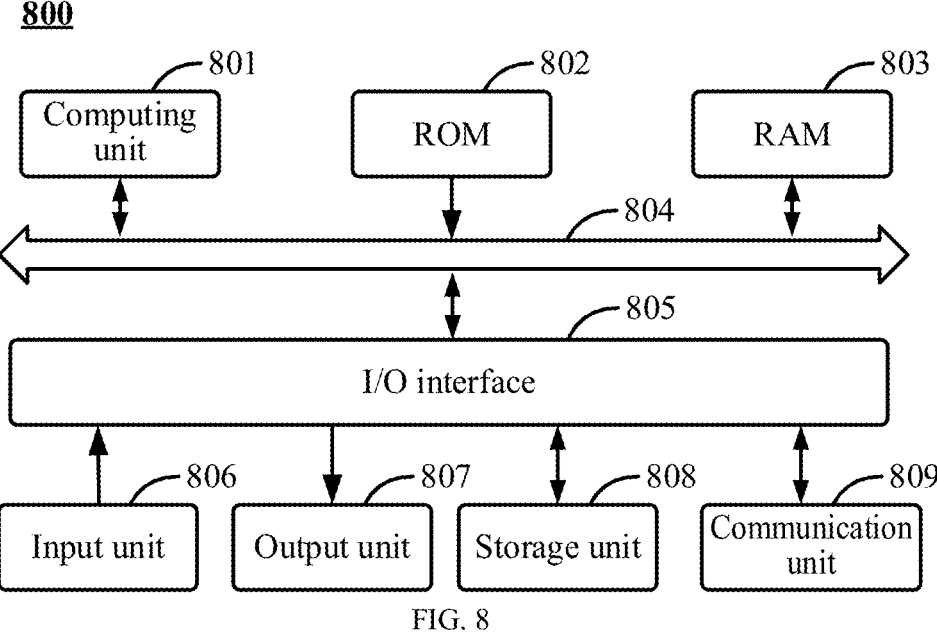
FIG. 8 illustrates a structural block diagram of an example electronic device that can be used to implement embodiments of the present disclosure.

Referring to FIG. 8, a structural block diagram of an electronic device 800 that may be a server or client of the present disclosure is now described, which is an example of a hardware device that may be applicable to aspects of the present disclosure. Electronic devices are intended to represent various forms of digital electronic computer devices, such as laptop computers, desktop computers, workstations, personal digital assistants, servers, blade servers, mainframe computers, and other suitable computers. The electronic devices may also represent various forms of mobile devices, such as personal digital processing, cellular telephones, smart phones, wearable devices, and other similar computing devices. The components shown herein, their connections and relationships, and their functions are merely as examples, and are not intended to limit the implementations of the disclosure described and/or claimed herein.

As shown in FIG. 8, the electronic device 800 includes a computing unit 801, which may perform various appropriate actions and processing according to a computer program stored in a read-only memory (ROM) 802 or a computer program loaded into a random access memory (RAM) 803 from a storage unit 808. In the RAM 803, various programs and data required by the operation of the electronic device 800 may also be stored. The computing unit 801, the ROM 802, and the RAM 803 are connected to each other through a bus 804. Input/output (I/O) interface 805 is also connected to the bus 804.

A plurality of components in the electronic device 800 are connected to a I/O interface 805, including: an input unit 806, an output unit 807, a storage unit 808, and a communication unit 809. The input unit 806 may be any type of device capable of inputting information to the electronic device 800, the input unit 806 may receive input digital or character information and generate a key signal input related to user setting and/or function control of the electronic device, and may include, but is not limited to, a mouse, a keyboard, a touch screen, a track pad, a trackball, a joystick, a microphone, and/or a remote control. The output unit 807 may be any type of device capable of presenting information, and may include, but are not limited to, a display, a speaker, a video/audio output terminal, a vibrator, and/or a printer. The storage unit 808 may include, but is not limited to, a magnetic disk and an optical disk. The communication unit 809 allows the electronic device 800 to exchange information/data with other devices over a computer network, such as the Internet, and/or various telecommunication networks, and may include, but is not limited to, a modem, a network card, an infrared communication device, a wireless communication transceiver and/or a chipset, such as a Bluetooth device, a 802.11 device, a WiFi device, a WiMAX device, a cellular communication device, and/or the like.

The computing unit 801 may be a variety of general and/or special purpose processing components with processing and computing capabilities. Some examples of the computing unit 801 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, etc. The computing unit 801 performs the various methods and processes described above, for example, the method 200. For example, in some embodiments, the method 200 may be implemented as a computer software program tangibly contained in a machine-readable medium, such as the storage unit 808. In some embodiments, part or all of the computer program may be loaded and/or installed onto the electronic device 800 via the ROM 802 and/or the communication unit 809. When the computer program is loaded to the RAM 803 and executed by the computing unit 801, one or more steps of the method 200 described above may be performed. Alternatively, in other embodiments, the computing unit 801 may be configured to perform the method 200 by any other suitable means (e.g., with the aid of firmware).

Various embodiments of the systems and techniques described above herein may be implemented in a digital electronic circuit system, an integrated circuit system, a field programmable gate array (FPGA), an application specific integrated circuit (ASIC), a dedicated standard product (ASSP), a system of system on a chip system (SoC), a complex programmable logic device (CPLD), computer hardware, firmware, software, and/or combinations thereof. These various embodiments may include: implementation in one or more computer programs that may be executed and/or interpreted on a programmable system including at least one programmable processor, where the programmable processor may be a dedicated or universal programmable processor that may receive data and instructions from a storage system, at least one input device, and at least one output device, and transmit data and instructions to the storage system, the at least one input device, and the at least one output device.

The program code for implementing the method of the present disclosure may be written in any combination of one or more programming languages. These program code may be provided to a processor or controller of a general-purpose computer, a special purpose computer, or other programmable data processing device such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium, which may contain or store a program for use by or in conjunction with an instruction execution system, device, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of a machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with a user, the systems and techniques described herein may be implemented on a computer having: a display device (e.g., a CRT (cathode ray tube) or an LCD (liquid crystal display) monitor) for displaying information to a user; and a keyboard and pointing device (e.g., a mouse or trackball) by which a user may provide input to the computer. Other types of devices may also be used to provide interaction with a user; for example, the feedback provided to the user may be any form of perception feedback (e.g., visual feedback, auditory feedback, or tactile feedback); and the input from the user may be received in any form, including acoustic input, voice input, or haptic input.

The systems and techniques described herein may be implemented in a computing system including a back-end component (e.g., as a data server), or a computing system including a middleware component (e.g., an application server), or a computing system including a front-end component (e.g., a user computer with a graphic user interface or a web browser, the user may interact with implementations of the systems and techniques described herein through the graphic user interface or the web browser), or in a computing system including any combination of such back-end components, middleware components, or front-end components. The components of the system may be interconnected by digital data communication (e.g., a communications network) in any form or medium. Examples of communication networks include a local area network (LAN), a wide area network (WAN), the Internet, and a blockchain network.

The computer system may include a client and a server. Clients and servers are generally remote from each other and typically interact through a communication network. The relationship between clients and servers is generated by computer programs running on respective computers and having a client-server relationship to each other. The server may be a cloud server, or may be a server of a distributed system, or a server incorporating a blockchain.

It should be understood that the various forms of processes shown above may be used, and the steps may be reordered, added, or deleted. For example, the steps described in the present disclosure may be performed in parallel or sequentially or in a different order, as long as the results expected by the technical solutions disclosed in the present disclosure can be achieved, and no limitation is made herein.

Although embodiments or examples of the present disclosure have been described with reference to the accompanying drawings, it should be understood that the foregoing methods, systems, and devices are merely embodiments or examples, and the scope of the present disclosure is not limited by these embodiments or examples, but is only defined by the authorized claims and their equivalents. Various elements in the embodiments or examples may be omitted or may be replaced by equivalent elements thereof. Further, the steps may be performed in an order different from that described in the present disclosure. Further, various elements in the embodiments or examples may be combined in various ways. Importantly, with the evolution of the technology, many elements described herein may be replaced by equivalent elements appearing after the present disclosure.

What is claimed is:

1. A method, comprising:
 obtaining an editing instruction input by a user in a current round of a dialogue and history dialogue information in at least one history round of the dialogue, wherein the history dialogue information comprises a history dialogue text and at least one history image;
 determining a source image to be edited from the at least one history image based on the editing instruction and the history dialogue information; and
 editing the source image to generate a target image based on the editing instruction, wherein editing the source image comprises:

obtaining a source description text of the source image;
 determining a target description text of the target image based on the source description text and the editing instruction; and
 generating the target image based on the target description text, wherein the source description text is used to control the process for generating the target image, and wherein generating the target image comprises:
 denoising, based on the source description text, a first initial image by performing a plurality of first iterations using a text-to-image diffusion model, and recording random variable values sampled in each first iteration of the plurality of first iterations; and
 denoising, based on the target description text, a second initial image by performing a plurality of second iterations using the text-to-image diffusion model to generate the target image, wherein the plurality of second iterations correspond to the plurality of first iterations, respectively, and wherein each second iteration of the plurality of second iterations reuses the random variable values sampled in a corresponding first iteration.

2. The method according to claim 1, wherein determining the source image to be edited from the at least one history image comprises:
 obtaining a set prompt template, wherein the prompt template comprises a guide text for guiding a language model to determine the source image to be edited from the at least one history image and slots to be filled;
 filling the editing instruction and the history dialogue information into the slots to obtain input information; and
 inputting the input information into the language model to obtain the source image output by the language model.

3. The method according to claim 1, wherein determining the target description text of the target image comprises:
 rewriting, based on the editing instruction, the source description text using a language model to obtain the target description text.

4. The method according to claim 1, wherein the text-to-image diffusion model comprises a text encoder and a noise generation network, and wherein each second iteration of the plurality of second iterations comprises:
 inputting the target description text into the text encoder to generate a target text vector corresponding to the target description text;
 inputting the target text vector and the random variable values sampled in the first iteration of the corresponding round into the noise generation network to obtain a predicted noise of a current image; and
 removing the predicted noise from the current image to obtain a result image of the second iteration,
 wherein the current image in a first second iteration is the second initial image, and the current image in a second second iteration or each subsequent second iteration is the result image generated in a previous second iteration.

5. The method according to claim 1, wherein the second initial image is generated based on the source image.

6. The method according to claim 5, wherein the second initial image is obtained by adding noise to the source image.

7. An electronic device, comprising: a processor; and a memory communicatively connected to the processor; wherein the memory stores instructions executable by the processor, and the instructions, when executed by the processor, cause the processor to perform operations comprising:

obtaining an editing instruction input by a user in a current round of a dialogue and history dialogue information in at least one history round of the dialogue, wherein the history dialogue information comprises a history dialogue text and at least one history image;

determining a source image to be edited from the at least one history image based on the editing instruction and the history dialogue information; and editing the source image to generate a target image based on the editing instruction, wherein editing the source image comprises:

obtaining a source description text of the source image;

determining a target description text of the target image based on the source description text and the editing instruction; and generating the target image based on the target description text, wherein the source description text is used to control the process for generating the target image, and wherein generating the target image comprises:

denoising, based on the source description text, a first initial image by performing a plurality of first iterations using a text-to-image diffusion model, and recording random variable values sampled in each first iteration of the plurality of first iterations; and denoising, based on the target description text, a second initial image by performing a plurality of second iterations using the text-to-image diffusion model to generate the target image, wherein the plurality of second iterations correspond to the plurality of first iterations, respectively, and wherein each second iteration of the plurality of second iterations reuses the random variable values sampled in a corresponding first iteration.

8. The electronic device according to claim 7, wherein determining the source image to be edited from the at least one history image comprises:

obtaining a set prompt template, wherein the prompt template comprises a guide text for guiding a language model to determine the source image to be edited from the at least one history image and slots to be filled;

filling the editing instruction and the history dialogue information into the slots to obtain input information; and inputting the input information into the language model to obtain the source image output by the language model.

9. The electronic device according to claim 7, wherein determining the target description text of the target image comprises:

rewriting, based on the editing instruction, the source description text using a language model to obtain the target description text.

10. The electronic device according to claim 7, wherein the text-to-image diffusion model comprises a text encoder and a noise generation network, and wherein each second iteration of the plurality of second iterations comprises:

inputting the target description text into the text encoder to generate a target text vector corresponding to the target description text;

inputting the target text vector and the random variable values sampled in the first iteration of the corresponding round into the noise generation network to obtain a predicted noise of a current image; and removing the predicted noise from the current image to obtain a result image of the second iteration, wherein the current image in a first second iteration is the second initial image, and the current image in a second second iteration or each subsequent second iteration is the result image generated in a previous second iteration.

11. The electronic device according to claim 7, wherein the second initial image is generated based on the source image.

12. The electronic device according to claim 11, wherein the second initial image is obtained by adding noise to the source image.

13. A non-transitory computer readable storage medium storing computer instructions, wherein the computer instructions are configured to enable a computer to perform operations comprising:

obtaining an editing instruction input by a user in a current round of a dialogue and history dialogue information in at least one history round of the dialogue, wherein the history dialogue information comprises a history dialogue text and at least one history image;

determining a source image to be edited from the at least one history image based on the editing instruction and the history dialogue information; and editing the source image to generate a target image based on the editing instruction, wherein editing the source image comprises:

obtaining a source description text of the source image;

determining a target description text of the target image based on the source description text and the editing instruction; and generating the target image based on the target description text, wherein the source description text is used to control the process for generating the target image, and wherein generating the target image comprises:

denoising, based on the source description text, a first initial image by performing a plurality of first iterations using a text-to-image diffusion model, and recording random variable values sampled in each first iteration of the plurality of first iterations; and denoising, based on the target description text, a second initial image by performing a plurality of second iterations using the text-to-image diffusion model to generate the target image, wherein the plurality of second iterations correspond to the plurality of first iterations, respectively, and wherein each second iteration of the plurality of second iterations reuses the random variable values sampled in a corresponding first iteration.

14. The storage medium according to claim 13, wherein determining the source image to be edited from the at least one history image comprises:

obtaining a set prompt template, wherein the prompt template comprises a guide text for guiding a language model to determine the source image to be edited from the at least one history image and slots to be filled;

filling the editing instruction and the history dialogue information into the slots to obtain input information; and inputting the input information into the language model to obtain the source image output by the language model.

15. The storage medium according to claim 13, wherein determining the target description text of the target image comprises:

rewriting, based on the editing instruction, the source description text using a language model to obtain the target description text.

* * * * *